United States Patent
Otsuki et al.

(10) Patent No.: US 10,590,250 B2
(45) Date of Patent: Mar. 17, 2020

(54) FIBER-REINFORCED PLASTIC MOLDING MATERIAL, METHOD FOR PRODUCING SAME, AND MOLDED ARTICLE

(71) Applicant: NIPPON STEEL & SUMIKIN CHEMICAL CO., LTD., Tokyo (JP)

(72) Inventors: Akihisa Otsuki, Kisarazu (JP); Hiroyuki Takahashi, Kisarazu (JP); Hideki Andoh, Kisarazu (JP)

(73) Assignee: NIPPON STEEL CHEMICAL & MATERIAL CO., LTD., Tokyo (JP)

(*) Notice: Subject to any disclaimer, the term of this patent is extended or adjusted under 35 U.S.C. 154(b) by 106 days.

(21) Appl. No.: 15/558,947

(22) PCT Filed: Mar. 22, 2016

(86) PCT No.: PCT/JP2016/058990
§ 371 (c)(1),
(2) Date: Sep. 15, 2017

(87) PCT Pub. No.: WO2016/152856
PCT Pub. Date: Sep. 29, 2016

(65) Prior Publication Data
US 2018/0079879 A1   Mar. 22, 2018

(30) Foreign Application Priority Data

Mar. 26, 2015  (JP) ................................. 2015-064914
Mar. 31, 2015  (JP) ................................. 2015-071699

(51) Int. Cl.
| | |
|---|---|
| B32B 27/12 | (2006.01) |
| C08J 5/24 | (2006.01) |
| C08J 3/12 | (2006.01) |
| B05D 1/00 | (2006.01) |
| B29C 43/02 | (2006.01) |
| B29C 43/52 | (2006.01) |
| C09D 5/03 | (2006.01) |
| C09J 9/00 | (2006.01) |

(52) U.S. Cl.
CPC .............. *C08J 5/24* (2013.01); *B05D 1/007* (2013.01); *B29C 43/02* (2013.01); *B29C 43/52* (2013.01); *C08J 3/12* (2013.01); *C08J 3/122* (2013.01); *C08J 2361/06* (2013.01); *C08J 2363/00* (2013.01); *C08J 2463/00* (2013.01)

(58) Field of Classification Search
None
See application file for complete search history.

(56) References Cited

U.S. PATENT DOCUMENTS

| | | | |
|---|---|---|---|
| 2008/0206480 A1 | 8/2008 | Moens et al. | |
| 2011/0159266 A1* | 6/2011 | Boyd | ................ C08G 59/4021 428/220 |
| 2011/0241249 A1 | 10/2011 | Orange et al. | |

FOREIGN PATENT DOCUMENTS

| | | | | | |
|---|---|---|---|---|---|
| EP | 3 026 076 A1 | | 6/2016 | | |
| JP | 56115374 A | * | 9/1981 | ................ | C09J 7/00 |
| JP | 03288629 A | * | 12/1991 | ............. | B29C 67/22 |
| JP | 9-100360 A | | 4/1997 | | |
| JP | 2006232915 A | * | 9/2006 | ............. | C08G 59/42 |
| JP | 2008-516020 A | | 5/2008 | | |
| JP | 2010126694 A | * | 6/2010 | ............. | C08G 65/40 |
| JP | 2010214704 A | * | 9/2010 | ............. | B29B 11/16 |
| JP | 2011190430 A | * | 9/2011 | ................ | C08J 5/24 |
| WO | WO-98/50211 A1 | | 11/1998 | | |
| WO | WO-2014157132 A1 | * | 10/2014 | ............. | C08L 71/00 |
| WO | WO-2015145408 A1 | * | 10/2015 | ................ | C09J 5/06 |

OTHER PUBLICATIONS

InChemRez Phenoxy Resins Product and Application Guide. (Year: 2002).*
Machine translation of JP 56-115374 A (no date).*
Translation of JP 56-115374 A (no date).*
Supplementary European Search Report for the Application No. EP 16 768 759.9 dated Sep. 21, 2018.
Database WPI Week 199725 Thomson Scientific London, GB; AN 1997-276771 XP002784562 (and JP 9-100360 A). 1997.
International Search Report for the Application No. PCT/JP2016/058990 dated Jun. 21, 2016.
English Translation of Written Opinion of the International Searching Authority (PCT/ISA/237) for Application No. PCT/JP2016/058990 dated Oct. 5, 2017.

* cited by examiner

*Primary Examiner* — Michael J Feely
(74) *Attorney, Agent, or Firm* — Cheng Law Group, PLLC

(57) ABSTRACT

Provided are an fiber-reinforced plastic molding material having a satisfactory handling property, long storage stability, and high moldability enabling shaping into even a complicated shape, and a molded article thereof having excellent heat resistance, mechanical strength, and a method of producing the same. The fiber-reinforced plastic molding material includes a matrix resin containing, as an essential component, a phenoxy resin being solid at ordinary temperature and having a melt viscosity of 3,000 Pa·s or less at anywhere in the temperature region of from 160° C. to 220° C., with an epoxy resin and across-linking agent being blended as desired, in which the matrix resin is turned into fine powder having an average particle diameter (d50) of from 10 μm to 150 μm, and the matrix resin is caused to adhere to a reinforcing fiber base material by powder coating so as to achieve a resin content of from 20% to 50%.

14 Claims, No Drawings

FIBER-REINFORCED PLASTIC MOLDING MATERIAL, METHOD FOR PRODUCING SAME, AND MOLDED ARTICLE

TECHNICAL FIELD

The present invention relates to a fiber-reinforced plastic molding material, a method of producing the same, and a molded article of the same.

BACKGROUND ART

A fiber-reinforced plastic (FRP) material, which is a composite material of fiber, for example, glass fiber or carbon fiber and a plastic, is a material that has long been used for sports and leisure, such as tennis rackets, bicycles, and fishing rods, by taking advantage of its features of being lightweight and having high strength and high rigidity. In recent years, applications of the fiber-reinforced plastic material have been continuously expanding, and its development ranges from consumer equipment to industrial equipment, for example, from housings of electronic devices, such as notebook PCs and tablets, to arms of industrial robots and the like, and reinforcing materials for architectural structures.

Further, due to a recent rise in crude oil price and increase in awareness of global environmental protection, there is a strong demand for energy savings and resource savings. Particularly in transportation equipment, such as automobiles and aviation equipment, in which fossil fuel is used, lowering of fuel consumption has been actively promoted. The lowering of the fuel consumption of the transportation equipment is extremely greatly affected by lightweighting of a vehicle body, and hence an FRP using carbon fiber has started to be used in such applications in place of a metal material.

The FRP material is produced by impregnating a reinforcing fiber base material with a liquid matrix resin, followed by curing. As the liquid resin that the reinforcing fiber base material is to be impregnated with, there has been mainly used a thermosetting resin, for example, an epoxy resin because of ease with which the fiber base material is impregnated with the resin. However, when the thermosetting resin is used as the matrix resin, it is generally essential to use a curing agent in combination therewith, and hence there are problems in that: such mixture has a large storage load and requires a long curing time, and hence productivity is low; and the mixture lacks recyclability like that of the metal material. There is a strong demand for amelioration of the problems. As an FRP molding material, there has been generally used a prepreg, which is obtained by dissolving the thermosetting resin in a solvent together with the curing agent, impregnating the reinforcing fiber base material with the solution, and then retaining the resultant in a heated and semicured (B-stage) state. However, the prepreg has had the above-mentioned problems.

Accordingly, in Patent Literature 1, there is a proposal that an FRP molding prepreg be obtained by melt-kneading a solid epoxy resin having a softening point (Ts) of 50° C. or more and a melt viscosity at 150° C. measured with a cone-plate viscometer of 500 mPa·s or less, another bisphenol-type solid epoxy resin, a tetracarboxylic acid dianhydride, and a curing accelerator to provide an epoxy resin composition, pulverizing the epoxy resin composition into powder, and applying the powder to a reinforcing fiber base material, followed by heating and melting. However, in this technique, it is essential that two kinds of different solid epoxy resins be used in combination as the epoxy resin serving as the matrix resin, and besides, the curing agent is used. Accordingly, as shown in Examples, even with the use of the curing accelerator, a curing time is as long as 1 hour. Besides, a cured product of the matrix resin has a glass transition point (Tg) of 150° C. or less, and hence its heat resistance is insufficient. In addition, in a curing reaction using an epoxy resin monomer that is a low-molecular-weight species, the following problems may occur: burr and dripping resulting from low viscosity; and molding failures, such as curing shrinkage and strain due to a curing reaction because of many reaction sites (functional groups). Thus, molding is not as easy as with a thermoplastic resin, and hence it is considered that the technique is not suitable for molding processing of a housing having a complicated shape like an electronic device.

Meanwhile, there has also been considered a technique involving using, for the matrix resin, a thermoplastic resin, which does not require a curing reaction, in place of the thermosetting resin, to thereby solve the problems. For example, in Patent Literature 2, there is proposed a prepreg of a fiber-reinforced plastic material impregnated by a technique involving, for example, bringing a low-molecular-weight polyamide resin in a powder state having reduced numbers of terminal amino groups and carboxyl groups into contact with a reinforcing base material. However, because of the low molecular weight of the polyamide resin used, mechanical physical properties of the FRP are somewhat low. In addition, its molding temperature is as high as 290° C., and hence temperature increase and temperature decrease require time. Accordingly, the technique is unsuitable for producing an FRP molded article with good productivity.

In addition, in Patent Literature 3, there is a disclosure of a novel phenoxy resin having high moldability and high heat resistance, and there is also a disclosure that a reinforcing fiber base material can be impregnated with the phenoxy resin by a hot-melt method or a solvent method to produce an FRP molding prepreg. However, this technique essentially requires a special fused ring structure-containing phenoxy resin. The phenoxy resin has a glass transition temperature (Tg) of at most about 150° C., and hence is insufficient for application to a member to be used under a harsh environment in an automobile or the like. Also when applied to a vehicle body, the phenoxy resin cannot withstand the temperature during baking finishing. Therefore, primer treatment or the like is separately required, and hence an extra step required in a production process. In addition, the hot-melt method is generally difficult when the resin for impregnation has a large molecular weight. The phenoxy resin has a molecular weight of from about 30,000 to about 70,000, and hence application of the hot-melt method thereto is considered to be difficult. In addition, in the solvent method, a large amount of a solvent is used in order to improve an impregnating property, and hence the prepreg to be obtained has a drawback in that its tackiness is strong owing to a residual solvent, resulting in difficulty in workability. Further, there is no disclosure of Example or Comparative Example of the prepreg using the phenoxy resin.

As described above, the FRP molding material is required to be capable of melting at relatively low temperature to significantly shorten a molding time (high moldability and high productivity), and at the same time, is required to be capable of being shaped into a complicated shape like a housing of a notebook PC or a liquid crystal tablet, and to provide an FRP molded article having excellent characteristics (high toughness, high heat resistance, and long lifetime).

In view of the foregoing, a technique involving increasing the Tg of a low-Tg thermoplastic resin by a cross-linking reaction utilizing heat at the time of molding processing is currently under consideration. For example, in Patent Literature 4, there is a disclosure of a phenoxy resin composition whose heat resistance can be improved by adding a cross-linking agent to a phenoxy resin, which is a thermoplastic resin, and applying heat thereto to cause a cross-linking reaction, and it is mentioned that the phenoxy resin composition can be used in molding processing, though an optical part is produced. However, even in this material, thermal history at the time of the molding processing is not enough for the cross-linking reaction for improving the Tg, and hence heat treatment for from 30 min to 60 min is separately required. In addition, in kneading of the material in a stage prior to the molding, a reaction with the cross-linking agent present therein is liable to proceed to cause gelation, and hence there is a problem of how to impregnate, with the material, a reinforcing fiber base material.

CITATION LIST

Patent Literature

[PTL 1] JP 2006-232915 A
[PTL 2] JP 2012-503693 A
[PTL 3] JP 2010-126694 A
[PTL 4] WO 2014-157132 A1

SUMMARY OF INVENTION

It is an object of the present invention to provide an FRP molding material that is excellent in storage stability, is capable of significantly shorten a period of time of molding processing by heat pressing as compared to the related art, and has high molding processability, and a method of producing the same.

The inventors of the present invention have made extensive investigations in order to achieve the object, and as a result, have found that when a phenoxy resin, which is a thermoplastic resin having good moldability, is used as an essential component of a matrix resin, and fine powder of the matrix resin is caused to adhere to a fiber-reinforced base material by using, for example, a powder coating method based on an electrostatic field to provide an FRP molding material, an FRP molded body having high heat resistance and mechanical strength is obtained with high productivity at low cost. Thus, the inventors have completed the present invention.

One embodiment of the present invention relates to a fiber-reinforced plastic molding material, including:

a matrix resin containing 50 wt % or more of a phenoxy resin being solid at ordinary temperature and having a melt viscosity of 3,000 Pa·s or less at anywhere in a temperature region of from 160° C. to 220° C. with respect to all resin components, the matrix resin having an average particle diameter (d50) of from 10 μm to 150 μm; and a reinforcing fiber base material to which fine powder of the matrix resin is caused to adhere by a powder coating method, in which a content of the matrix resin is from 20 wt % to 50 wt %.

It is desired that the phenoxy resin have any one or more of the following characteristics:

(1) a mass-average molecular weight Mw of from 20,000 to 100,000;
(2) a hydroxy group equivalent of from 50 g/eq to 750 g/eq;
(3) a glass transition temperature Tg of from 65° C. to 160° C.; and
(4) an average particle diameter (d50) of from 10 μm to 150 μm.

Examples of the fiber-reinforced plastic molding material include: one kind or two or more kinds of fibers selected from the group consisting of carbon fiber, boron fiber, silicon carbide fiber, glass fiber, and aramid fiber; and materials containing these fibers.

Another embodiment of the present invention relates to the fiber-reinforced plastic molding material, in which the matrix resin contains the phenoxy resin, an epoxy resin, and a cross-linking agent as essential components, the epoxy resin being blended in an amount of from 9 parts by weight to 85 parts by weight with respect to 100 parts by weight of the phenoxy resin, and the matrix resin and the phenoxy resin both include a matrix resin being solid at ordinary temperature and having a melt viscosity of 3,000 Pa·s or less at anywhere in the temperature region of from 160° C. to 220° C.

It is desired that the cross-linking agent (C) include an acid anhydride, and the acid anhydride be blended so that an amount of an acid anhydride group falls within a range of from 0.5 mol to 1.3 mol with respect to 1 mol of a secondary hydroxy group of the phenoxy resin (A).

It is desired that powder of the phenoxy resin (A) and powder of the epoxy resin (B) each have an average particle diameter (d50) of from 10 μm to 150 μm, and from 1 to 2 times as large as an average particle diameter (d50) of powder of the cross-linking agent (C).

Another embodiment of the present invention relates to a method of producing a fiber-reinforced plastic molding material, including:

preparing a matrix resin containing 50 wt % or more of a phenoxy resin being solid at ordinary temperature and having a melt viscosity of 3,000 Pa·s or less at anywhere in a temperature region of from 160° C. to 220° C. with respect to all resin components;

pulverizing the matrix resin to an average particle diameter (d50) of from 10 μm to 150 μm; and causing the resultant fine powder of the matrix resin to adhere to a reinforcing fiber base material by a powder coating method so as to achieve a matrix resin content of from 20 wt % to 50 wt %.

Another embodiment of the present invention relates to a method of producing a fiber-reinforced plastic molding material, including:

preparing, as a raw material matrix resin, a matrix resin being solid at ordinary temperature and having a melt viscosity of 3,000 Pa·s or less at anywhere in a temperature region of a temperature range of from 160° C. to 220° C., the matrix resin containing a phenoxy resin, an epoxy resin, and a cross-linking agent as essential components and containing 9 parts by weight to 85 parts by weight of the epoxy resin with respect to 100 parts by weight of the phenoxy resin;

pulverizing the matrix resin to an average particle diameter (d50) of from 10 μm to 150 μm; and causing the resultant fine powder of the matrix resin to adhere to a reinforcing fiber base material by a powder coating method so as to achieve a matrix resin content in a range of from 20 wt % to 50 wt %.

The powder coating method suitably includes a powder coating method utilizing an electrostatic field.

Another embodiment of the present invention relates to a phenoxy resin powder for producing the fiber-reinforced plastic molding material, the phenoxy resin powder having a melt viscosity of 3,000 Pa·s or less at anywhere in a temperature region of from 160° C. to 220° C. and having an average particle diameter (d50) of from 10 µm to 150 µm.

Another embodiment of the present invention relates to a fiber-reinforced plastic molded article, which is obtained by molding or curing the fiber-reinforced plastic molding material by heating and compression.

A matrix resin in the fiber-reinforced plastic molded article may include a cross-linked cured resin, the cross-linked cured resin having a glass transition temperature of 160° C. or more. In addition, the matrix resin in the fiber-reinforced plastic molded article may be a thermoplastic resin.

Other preferred embodiments of the present invention are described below.

A fiber-reinforced plastic molding intermediate base material, including a matrix resin containing, as an essential component, a phenoxy resin being solid at ordinary temperature and having a melt viscosity at 250° C. of 1,000 Pa·s or less, in which fine powder of the phenoxy resin having an average particle diameter (D50) of from 10 µm to 150 µm is caused to adhere to a reinforcing fiber base material by powder coating so as to achieve a resin content (RC) of from 20% to 50%.

It is desired that the phenoxy resin have a mass-average molecular weight (Mw) of from 20,000 to 100,000, a hydroxy group equivalent (g/eq) of from 50 to 750, or a glass transition temperature (Tg) of from 70° C. to 160° C. or less.

A method of producing a fiber-reinforced plastic molding intermediate base material, including: preparing, as a raw material matrix resin, a phenoxy resin being solid at ordinary temperature and having a melt viscosity at 250° C. of 1,000 Pa s or less; pulverizing the phenoxy resin to an average particle diameter (D50) of from 10 µm to 150 µm; and causing the resultant fine powder of the phenoxy resin to adhere to a reinforcing fiber base material by powder coating so as to achieve a resin content (RC) of from 20% to 50%.

A fiber-reinforced plastic molded article, which is obtained by molding the above-mentioned fiber-reinforced plastic molding intermediate base material by heating and compression.

A fiber-reinforced plastic molding intermediate base material, including a matrix resin composition being solid at ordinary temperature and having a melt viscosity at 160° C. of 2,000 Pa·s or less, the matrix resin composition containing a phenoxy resin (A), an epoxy resin (B), and a cross-linking agent (C) as essential components, the epoxy resin (B) being blended in an amount of from 9 parts by weight to 85 parts by weight with respect to 100 parts by weight of the phenoxy resin (A), in which fine powder of the matrix resin composition is caused to adhere to a reinforcing fiber base material by powder coating so as to achieve a content of the matrix resin composition (RC) in a range of from 20% to 50%.

The fiber-reinforced plastic molding intermediate base material is preferably such that a cross-linked or cured product obtained by cross-linking or curing the matrix resin composition exhibits a glass transition temperature (Tg) of 160° C. or more. In the matrix resin composition: it is preferred that the phenoxy resin (A) have a glass transition temperature (Tg) of from 65° C. to 100° C. or less; it is preferred that the cross-linking agent (C) be an acid anhydride, and be blended so that an amount of an acid anhydride group falls within a range of from 0.5 mol to 1.3 mol with respect to 1 mol of a secondary hydroxy group of the phenoxy resin (A); it is preferred that powder of the phenoxy resin (A) and powder of the epoxy resin (B) each have an average particle diameter (D50) of from 10 µm to 150 µm, and from 1 to 1.5 times as large as an average particle diameter of powder of the cross-linking agent (C); it is preferred that the adhesion of the matrix resin composition powder to the reinforcing fiber base material is performed by powder coating utilizing an electrostatic field; and it is preferred that the reinforcing fiber base material be selected from the group consisting of carbon fiber, boron fiber, silicon carbide fiber, glass fiber, and aramid fiber.

A method of producing the above-mentioned fiber-reinforced plastic molding intermediate base material, including: pulverizing each of the phenoxy resin (A), the epoxy resin (B), and the cross-linking agent (C); then blending the phenoxy resin (A), the epoxy resin (B), and the cross-linking agent (C); and causing fine powder of the matrix resin composition being solid at ordinary temperature and having a melt viscosity at 160° C. of 2,000 Pa·s or less to adhere to the reinforcing fiber base material by powder coating so as to achieve a content of the matrix resin composition (RC) in the range of from 20% to 50%.

There is disclosed a fiber-reinforced plastic molded article, which is obtained by molding the above-mentioned fiber-reinforced plastic molding intermediate base material by heating and compression. In such fiber-reinforced plastic molded article, a cross-linked or cured product of the matrix resin composition has a glass transition temperature (Tg) of 160° C. or more.

Advantageous Effects of Invention

The fiber-reinforced plastic molding material of the present invention uses the phenoxy resin that is thermoplastic as the matrix resin, and at the same time, can be easily handled as with a related-art prepreg using a thermosetting resin, and as compared to the prepreg, is excellent in storage stability at ordinary temperature and can advantageously provide a fiber-reinforced plastic molded article free of tackiness.

DESCRIPTION OF EMBODIMENTS

Now, the present invention is described in detail.

A fiber-reinforced plastic molding material of the present invention includes a matrix resin containing, as an essential component, a phenoxy resin being solid at ordinary temperature. The FRP molding intermediate base material of the present invention uses the phenoxy resin, which is a thermoplastic resin, in the matrix resin, and hence facilitates compression molding by heating pressing, to thereby be able to greatly improve productivity.

The matrix resin may be the phenoxy resin alone, or may have blended therein, for example, an epoxy resin and a cross-linking agent in addition to the phenoxy resin. However, it is not desired that a solvent be blended. The matrix resin is finely powdered and caused to adhere to a reinforcing fiber base material by a powder coating method, preferably a powder coating method utilizing an electrostatic field (electrostatic coating method). The phenoxy resin being solid at ordinary temperature and the like serving as the matrix resin are finely pulverized and caused to adhere to the reinforcing fiber base material by the electrostatic coating method. Accordingly, even with a relatively high melt viscosity, the fine powder of the matrix resin melts by heat at the time of molding, and the matrix resin permeates the inside of the fiber base material. Thus, a molded article having satisfactory physical properties is obtained.

The phenoxy resin to be used as an essential component of the matrix resin is solid at ordinary temperature and exhibits a melt viscosity of 3,000 Pa·s or less at anywhere in the temperature region of from 160° C. to 220° C. The melt viscosity is preferably from 30 Pa·s to 2,900 Pa·s, more preferably from 100 Pa·s to 2,800 Pa·s. In the present invention, the phenoxy resin being solid at ordinary temperature is caused to uniformly adhere to the reinforcing fiber base material by electrostatic powder coating. When the melt viscosity is more than 3,000 Pa·s everywhere in the temperature region of from 160° C. to 220° C., the fluidity of the phenoxy resin at the time of molding processing degrades, and hence the phenoxy resin of the fine powder adhering onto the surface of the fiber base material does not sufficiently permeate the inside of the fiber base material. This causes a void, resulting in lowering of the mechanical physical properties of the molded article.

When the matrix resin is formed of a thermoplastic resin, for example, the phenoxy resin, its viscosity decreases with an increase in temperature. However, when the matrix resin contains an epoxy resin or a cross-linking agent, a cross-linking or curing reaction may occur to increase viscosity during temperature increase. Therefore, the viscosity of the matrix resin at from 160° C. to 220° C. is also the lowest viscosity in the case where the temperature is increased under a condition shown in Examples.

Herein, the temperature region of from 160° C. to 220° C. corresponds to temperatures at which molding pressing is performed. When the melt viscosity of the matrix resin of the molding material is 3,000 Pa·s or less at anywhere in the temperature range, an FRP molded article having satisfactory mechanical physical properties is obtained. That is, as long as the melt viscosity of the matrix resin is 3,000 Pa·s or less at anywhere in the temperature region, the melt viscosity may be more than 3,000 Pa·s in part of the temperature region without any problem. When the matrix resin is a system of the phenoxy resin alone (when the matrix resin does not contain an epoxy resin or a cross-linking agent to be described later), the melt viscosity continues to lower along with an increase in temperature, and hence the melt viscosity becomes lowest at a melting temperature of 220° C.

Even in the case where an FRP molded body obtained by subjecting the FRP molding material containing the phenoxy resin as an essential component of the present invention to heating compression molding needs to be disposed of after being used as a material applied to any of various applications, the FRP molded body, when not cross-linked or cured, can be recycled by being separated into the reinforcing fiber and the matrix resin through the use of heat or a solvent instead of being discarded.

The phenoxy resin is a thermoplastic resin obtained by a condensation reaction between a dihydric phenol compound and an epihalohydrin, or a polyaddition reaction between a dihydric phenol compound and a bifunctional epoxy resin, and may be obtained in a solution or in the absence of a solvent by a hitherto known method. The phenoxy resin has an average molecular weight of generally from 10,000 to 200,000, preferably from 20,000 to 100,000, more preferably from 30,000 to 80,000 as a mass-average molecular weight (Mw). When the Mw is excessively low, the strength of the molded body is poor, and when the Mw is excessively high, workability or processability is liable to be poor. The Mw refers to a value measured by gel permeation chromatography (GPC) and converted using a standard polystyrene calibration curve.

In addition, the hydroxy group equivalent (g/eq) of the phenoxy resin is generally from 50 to 1,000, preferably from 50 to 750, particularly preferably from 50 to 500. When the hydroxy group equivalent is excessively low, the number of hydroxy groups increases to raise a water absorption rate, and hence there is a concern that mechanical physical properties may lower. When the hydroxy group equivalent is excessively high, the number of hydroxy groups is small, and hence wettability with carbon fiber constituting the reinforcing fiber base material lowers. In addition, a cross-link density is low even when a cross-linking agent is used, and hence the mechanical physical properties are not enhanced. As used herein, the term "hydroxy group equivalent" means a secondary hydroxy group equivalent.

The glass transition temperature (Tg) of the phenoxy resin is suitably from 65° C. to 160° C., preferably from 70° C. to 150° C. When the glass transition temperature is less than 65° C., moldability becomes better, but a problem arises in storage stability of powder or tackiness of a preform. When the glass transition temperature is more than 160° C., the melt viscosity also increases to degrade moldability and a filling property into fiber, with the result that press molding at higher temperature is required. The glass transition temperature of the phenoxy resin is a numerical value determined from a peak value of a second scan by performing measurement with a differential scanning calorimeter under the temperature increase condition of 10° C./min in the range of from 20° C. to 280° C.

The phenoxy resin is not particularly limited as long as the phenoxy resin satisfies the above-mentioned physical properties. Examples thereof include bisphenol A-type phenoxy resins (e.g., Phenotohto YP-50, YP-50S, and YP-55U manufactured by Nippon Steel & Sumikin Chemical Co., Ltd.), bisphenol F-type phenoxy resins (e.g., Phenotohto FX-316 manufactured by Nippon Steel & Sumikin Chemical Co., Ltd.), or copolymer-type phenoxy resins of bisphenol A and bisphenol F (e.g., YP-70 manufactured by Nippon Steel & Sumikin Chemical Co., Ltd.), and specific phenoxy resins except the above-mentioned resins (e.g., Phenotohto YPB-43C and FX293 manufactured by Nippon Steel & Sumikin Chemical Co., Ltd.). The resins may be used alone or as a mixture thereof.

An epoxy resin (B) may be blended into the matrix resin together with the phenoxy resin (A). The blending of the epoxy resin can improve the impregnating property into the reinforcing fiber base material based on a reduction in melt viscosity of the matrix resin, and can improve heat resistance through the improvement of the cross-link density of the cured product of the matrix resin. In particular, the improvement of the heat resistance can greatly exceed the Tg of the phenoxy resin, and enables development even into applications in which higher heat resistance is required, such as automobile materials.

As the epoxy resin (B), any resin may be adopted to the present invention as long as the resin is a solid epoxy resin, and for example, a bifunctional or more epoxy resin is preferred. Examples thereof include, but not limited to, bisphenol A-type epoxy resins (e.g., Epotohto YD-011, YD-7011, and YD-900 manufactured by Nippon Steel & Sumikin Chemical Co., Ltd.), bisphenol F-type epoxy resins (e.g., Epotohto YDF-2001 manufactured by Nippon Steel & Sumikin Chemical Co., Ltd.), diphenyl ether-type epoxy resins (e.g., YSLV-80DE manufactured by Nippon Steel & Sumikin Chemical Co., Ltd.), tetramethylbisphenol F-type epoxy resins (e.g., YSLV-80XY manufactured by Nippon Steel & SumikinChemical Co., Ltd.), bisphenol sulfide-type epoxy resins (e.g., YSLV-120TE manufactured by Nippon Steel & Sumikin Chemical Co., Ltd.), hydroquinone-type epoxy resins (e.g., Epotohto YDC-1312 manufactured by Nippon Steel & Sumikin Chemical Co., Ltd.), phenol novolac-type epoxy resins (e.g., Epotohto YDPN-638 manufactured by Nippon Steel & Sumikin Chemical Co., Ltd.), ortho-cresol novolac-type epoxy resins (e.g., Epotohto YDCN-701, YDCN-702, YDCN-703, and YDCN-704 manufactured by Nippon Steel & Sumikin Chemical Co., Ltd.), aralkyl naphthalene diol novolac-type epoxy resins (e.g., ESN-355 manufactured by Nippon Steel & Sumikin Chemical Co., Ltd.), and triphenylmethane-type epoxy resins (e.g., EPPN-502H manufactured by Nippon Kayaku Co., Ltd.). Those resins may also be used as a mixture thereof.

In addition, in order to store the matrix resin as powder, it is more preferred that the epoxy resin (B) be also a crystalline epoxy resin that is solid at room temperature, and has a melting point of from 75° C. to 145° C. and a viscosity at 160° C. of 1.0 Pa·s or less. The crystalline epoxy resin has low melt viscosity, is easy to handle, and can lower the melt viscosity of the matrix resin containing the phenoxy resin as an essential component. When the viscosity is more than 1.0 Pa·s, the filling property of the matrix resin into the reinforcing fiber base material is poor, and the homogeneity of the fiber-reinforced plastic molded article (FRP molded article) to be obtained is poor.

Across-linking agent (C) may be blended into the matrix resin together with the phenoxy resin (A), for the purpose of improving the Tg of the matrix resin. The cross-linking agent (C) may be blended irrespective of whether or not the epoxy resin (B) is blended.

As the cross-linking agent, a cross-linking agent having two or more functional groups each capable of reacting with a OH group of the phenoxy resin may be used, and an acid anhydride is preferred. The acid anhydride generates two carboxy groups through hydrolysis, and hence is understood as having two of the above-mentioned functional groups.

As the cross-linking agent, any cross-linking agent having two or more functional groups each reactive to a secondary hydroxy group of the phenoxy resin may be used. However, the acid anhydride forms an ester bond with the secondary hydroxy group of the phenoxy resin, to thereby three-dimensionally cross-link the phenoxy resin. Accordingly, the cross-linking can be undone through a hydrolysis reaction, and hence recyclability is imparted to the FRP molded article. That is, even in the case of performing cross-linking and curing, when the curing agent is based on the acid anhydride, by virtue of the utilization of the ester bond between the phenoxy resin (A) and the cross-linking agent (C) in the curing of the matrix resin, the FRP molded article can be recycled, instead of being discarded, by being separated into the reinforcing fiber and the matrix resin through the utilization of the hydrolysis reaction.

The acid anhydride serving as the cross-linking agent is not particularly limited as long as the acid anhydride is solid at ordinary temperature and is free of sublimability. Examples thereof include trimellitic anhydride, pyromellitic anhydride, methylcyclohexenedicarboxylic anhydride, benzophenonetetracarboxylic anhydride, and tetrahydrophthalic anhydride. Those acid anhydrides may be used alone or as a mixture thereof. From the viewpoints of imparting heat resistance to the molded article and of reactivity, an acid anhydride having an aromatic ring having two or more acid anhydrides each capable of reacting with the secondary hydroxy group of the phenoxy resin is preferred. In particular, an aromatic compound having two acid anhydride groups, such as pyromellitic anhydride, is more preferred because the cross-link density improves and the heat resistance improves as compared to a hydroxy group with respect to trimellitic anhydride. An acid anhydride group reacts with a secondary hydroxy group, but the reactivity of a COOH group is weak. Therefore, in order to cause sufficient cross-linking using only the phenoxy resin and the acid anhydride, an acid anhydride compound having two acid anhydride groups is used.

The cross-linking agent causes an esterification reaction between an acid anhydride group of the acid anhydride and the secondary hydroxy group in the phenoxy resin, to thereby form a three-dimensioned cross-linked structure, and hence improves the Tg of the matrix resin.

When the epoxy resin (B) is present, reactions among the phenoxy resin (A), the epoxy resin (B), and the cross-linking agent (C) achieve cross-linking and curing through an esterification reaction between the secondary hydroxy group in the phenoxy resin (A) and the acid anhydride group of the cross-linking agent (C), and a reaction between a carboxyl group generated by the esterification reaction and an epoxy group of the epoxy resin (B). A cross-linked phenoxy resin can be obtained through the reaction between the phenoxy resin (A) and the cross-linking agent (C). However, when the epoxy resin (B) coexists, the carboxy group generated by the reaction between the acid anhydride group and the hydroxy group of the phenoxy resin is bonded to the epoxy group of the epoxy resin to accelerate the cross-linking reaction and improve the cross-link density, and moreover, the melt viscosity of the matrix resin can be reduced to enhance the impregnating property into the reinforcing fiber base material. Consequently, an FRP molding material suitable for obtaining an excellent FRP molded article having improved mechanical strength and the like is obtained. In the present invention, even when the epoxy resin (B) coexists, the phenoxy resin (A), which is a thermoplastic resin, serves as a main component, and it is considered that the esterification reaction between its secondary hydroxy group and the acid anhydride group of the cross-linking agent (C) is preferential. That is, when the acid anhydride to be used as the cross-linking agent (C) and the epoxy resin (B) coexist with the phenoxy resin (A), the reaction with the secondary hydroxy group occurs first, and then the carboxyl group generated by the ring-opening of an unreacted cross-linking agent or acid anhydride group reacts with the epoxy resin (B) to further improve the cross-link density. Accordingly, unlike a general prepreg containing an epoxy resin, which is a thermosetting resin, as a main component, the FRP molding material of the present invention has satisfactory moldability, and is excellent in storage stability in that the moldability and the physical properties of the FRP molded article are maintained even after long-term room-temperature storage under a state in which humidity is not controlled.

The matrix resin contains, as a resin component, 50 wt % or more, preferably 55 wt % or more of the phenoxy resin. Herein, the resin component includes a thermoplastic resin and a thermosetting resin, such as the epoxy resin, but does not include a non-resin component, for example, the cross-linking agent. The matrix resin includes the cross-linking agent besides the resin component, and does not include the reinforcing fiber base material.

In the matrix resin in which the epoxy resin (B) is present, the phenoxy resin (A) and the epoxy resin (B) are blended so that the blending amount of the epoxy resin (B) is from 9 parts by weight to 85 parts by weight with respect to 100 parts by weight of the phenoxy resin (A). The blending amount of the epoxy resin (B) is preferably from 9 parts by weight to 83 parts by weight, more preferably from 10 parts by weight to 80 parts by weight. When the blending amount of the epoxy resin (B) is more than 85 parts by weight, the curing of the epoxy resin requires time, and hence strength required for demolding is difficult to obtain in a short period of time, and besides, the recyclability of the FRP lowers. In addition, when the blending amount of the epoxy resin (B) is less than 9 parts by weight, the improving effect of the blending of the epoxy resin on the cross-link density is not obtained, with the result that the cured product of the matrix resin hardly expresses a Tg of 160° C. or more. In addition, the fluidity of the matrix resin degrades, and hence the impregnation of the reinforcing fiber base material therewith becomes difficult.

Also when the matrix resin contains the epoxy resin and the cross-linking agent together with the phenoxy resin, it is necessary that the matrix resin be solid at ordinary temperature and have a melt viscosity of 3,000 Pa·s or less at anywhere in the temperature region of from 160° C. to 220° C. The melt viscosity is preferably 2,900 Pa·s or less, more preferably 2,800 Pa·s or less. When the melt viscosity is more than 3,000 Pa·s, the impregnation of the reinforcing fiber base material with the matrix resin becomes insufficient, resulting in defects, such as internal voids, at the time of molding by heat pressing. In addition, variations in physical properties of the matrix resin of the molded article occur, and hence the mechanical physical properties of the FRP molded body lower.

When the matrix resin is a cross-linking system as described above instead of being a system of the phenoxy resin alone, its melt viscosity lowers along with an increase in temperature, and then the melt viscosity abruptly increases due to the initiation of a cross-linking reaction. For this reason, in ordinary cases, it is only necessary that the lowest melt viscosity before the initiation of the cross-linking reaction be 3,000 Pa·s or less in the temperature region of from 160° C. to 220° C. corresponding to a molding temperature. In any of the system of the phenoxy resin alone and the cross-linking system, as described above, as long as the melt viscosity of the matrix resin is 3,000 Pa·s or less at anywhere in the temperature range of from 160° C. to 220° C., a desired FRP molded body can be obtained. However, in the matrix resin containing the epoxy resin and the cross-linking agent together with the phenoxy resin (phenoxy resin cross-linking system), even when the melt viscosity of the phenoxy resin alone is 3,000 Pa·s or less at anywhere in the temperature range from 160° C. to 220° C., depending on the blending of the cross-linking agent, the cross-linking reaction may initiate early and the melt viscosity as the matrix resin may exceed 3,000 Pa·s everywhere in the above-mentioned temperature region. Accordingly, when the matrix resin is the phenoxy resin cross-linking system, not the melt viscosity of the phenoxy resin, but the melt viscosity of the matrix resin needs to be 3,000 Pa·s or less at anywhere in the above-mentioned temperature region.

Depending on the kind of the phenoxy resin, the temperature at which the melt viscosity becomes 3,000 Pa·s or less slightly varies, but as long as the melt viscosity is 3,000 Pa·s or less at least anywhere in the temperature region of from 160° C. to 220° C. serving as the molding temperature, FRP molding can be performed. The molding can be performed even when the molding temperature is a higher temperature, for example, 250° C., but particularly in the matrix resin of the phenoxy resin cross-linking system, the cross-linking reaction is liable to lead to a situation in which the melt viscosity is more than 3,000 Pa·s.

The blending amount of the cross-linking agent (C) generally falls within the range of from 0.5 mol to 1.3 mol of an acid anhydride group with respect to 1 mol of a secondary hydroxy group of the phenoxy resin (A). The amount preferably falls within the range of from 0.7 mol to 1.3 mol, more preferably from 1.1 mol to 1.3 mol. When the amount of an acid anhydride group is excessively small, the cross-link density is low, and hence the mechanical physical properties and the heat resistance are poor. When the amount is excessively large, an unreacted acid anhydride or carboxyl group adversely affects curing characteristics or the cross-link density.

Accordingly, the blending amount of the epoxy resin (B) is preferably adjusted depending on the blending amount of the cross-linking agent (C). Specifically, for the purpose of subjecting the carboxyl group to be generated by the reaction between the secondary hydroxy group of the phenoxy resin and the acid anhydride group of the cross-linking agent to a reaction with the epoxy resin (B), the blending amount of the epoxy resin (B) is desirably set to fall within the range of from 0.5 to 1.2 in terms of equivalent ratio with respect to the cross-linking agent (C). The equivalent ratio of the cross-linking agent and the epoxy resin is more preferably from 0.7 mol to 1.0 mol.

A cross-linked phenoxy resin molded article can be obtained by blending the cross-linking agent (C) into a resin composition containing the phenoxy resin and the epoxy resin. However, an accelerator (D) serving as a catalyst may be further added so that the cross-linking reaction may be reliably performed. The accelerator is not particularly limited as long as the accelerator is solid at ordinary temperature and free of sublimability. Examples thereof include: tertiary amines, such as triethylenediamine; imidazoles, such as 2-methylimidazole, 2-phenylimidazole, and 2-phenyl-4-methylimidazole; organic phosphines, such as triphenylphosphine; and tetraphenylboron salts, such as tetraphenylphosphonium tetraphenylborate. Those accelerators may be used alone or in combination thereof. In the FRP molding material of the present invention, the matrix resin fine powder is caused to adhere to the fiber base material by using powder coating based on an electrostatic field, and hence an imidazole-based latent catalyst having a catalyst activation temperature of 130° C. or more and being solid at ordinary temperature is preferably used as the accelerator.

When the curing accelerator (D) is used, the blending amount of the (D) is set to from 0.1 part by weight to 5 parts by weight with respect to 100 parts by weight of the total amount of the phenoxy resin (A), the epoxy resin (B), and the cross-linking agent (C). Any other additive is added by being appropriately adjusted so that the adhesion of the matrix resin powder to the fiber base material and the characteristics of the molded article are not impaired.

It is desired that the FRP molding material of the present invention contain a flame retardant and a flame retardant aid. The flame retardant may be any flame retardant that is solid at ordinary temperature and free of sublimability, and examples thereof include: inorganic flame retardants, such as calcium hydroxide; organic and inorganic phosphorus-based flame retardants, such as ammonium phosphates and phosphoric acid ester compounds; nitrogen-containing flame retardants, such as triazine compounds; and bromine-containing flame retardants, such as brominated phenoxy resins.

Of those, a brominated phenoxy resin or a phosphorus-containing phenoxy resin can be used to serve as both the flame retardant and the matrix resin, and hence may be preferably used.

The blending amount of the flame retardant (and the flame retardant aid) is appropriately selected depending on the kind of the flame retardant and a desired degree of flame retardancy, but it is preferred that the flame retardant (and the flame retardant aid) be blended within the range of generally from 0.01 part by weight to 50 parts by weight with respect to 100 parts by weight of the matrix resin to the extent that the adhesion property of the matrix resin and the physical properties of the FRP molded article are not impaired.

Further, into the FRP molding material of the present invention, there may be blended thermoplastic resin powder other than the phenoxy resin, for example, powder of a polyvinylidene chloride resin, a natural rubber, or a synthetic rubber, and various other additives, such as an inorganic filler, an extender pigment, a colorant, an antioxidant, and a UV protection agent, as long as a satisfactory adhesion property of the matrix resin powder to the fiber base material and the physical properties of the FRP molded article after molding are not impaired.

The FRP molding material of the present invention is obtained by: turning the matrix resin containing the above-mentioned phenoxy resin as an essential component into predetermined fine powder; and causing the matrix resin fine powder to adhere to a reinforcing fiber base material.

It is suitable that the fine powderization of the matrix resin containing the phenoxy resin as an essential component be performed using a pulverizing and mixing machine, for example, a low-temperature dry pulverizer (Centridry Mill), but the fine powderization is not limited thereto. In addition, for the pulverization of the matrix resin, the components may be pulverized before being mixed, or the components may be pulverized after being blended in advance. In this case, it is appropriate that pulverization conditions be set so that each fine powder has an average particle diameter to be described later. The thus obtained fine powder has an average particle diameter of from 10 μm to 150 μm, preferably from 40 μm to 100 μm, more preferably from 40 μm to 80 μm. When the average particle diameter is more than 150 μm, energy upon collision of the matrix resin with fiber in the powder coating in an electrostatic field increases, with the result that the rate of adhesion to the reinforcing fiber base material lowers. In addition, when the average particle diameter is less than 10 μm, particles scatter owing to an accompanying air flow to lower adhesion efficiency, and there is a risk in that resin fine powder floating in the atmosphere may cause the degradation of a working environment. In the case of matrix resin fine powder using the epoxy resin (B) and the cross-linking agent (C) in combination with the phenoxy resin (A), the average particle diameter of each of phenoxy resin (A) fine powder and epoxy resin (B) fine powder is preferably from 1 to 2 times as large as the average particle diameter of cross-linking agent (C) fine powder. When the particle diameter of the cross-linking agent fine powder is set to be smaller than the particle diameter of each of the phenoxy resin fine powder and the epoxy resin fine powder, the cross-linking agent is allowed to adhere to the inside of the reinforcing fiber base material, and moreover, the cross-linking agent can be uniformly present around phenoxy resin particles and epoxy resin particles to allow the cross-linking reaction to proceed reliably.

The fine powder of the matrix resin containing the phenoxy resin as an essential component is caused to adhere to the reinforcing fiber base material by a powder coating method, and thus the FRP molding material of the present invention is obtained. The powder coating method encompasses a flow coating method utilizing a fluidized bed and an electrostatic coating method utilizing an electrostatic field. In the present invention, in terms of the uniformity of the adhesion to the reinforcing fiber base material, the electrostatic coating method utilizing an electrostatic field is suitable, but the flow coating method using a fluidized bed may also be utilized.

The matrix resin is applied so that the amount of the matrix resin adhering to the reinforcing fiber base material (resin content: RC) be from 20% to 50%, preferably from 25% to 45%, more preferably from 25% to 40%. When the RC is more than 50%, mechanical physical properties, such as tensile and bending moduli of elasticity, of the FRP lower. When the RC is less than 10%, the excessively small adhesion amount of the resin makes the impregnation of the inside of the base material with the matrix resin insufficient, and hence there is a concern that both thermal physical properties and mechanical physical properties may lower.

The fine powder of the matrix resin subjected to the powder coating is fixed to the reinforcing fiber base material by heating and melting. The powder may be applied and then heated and fused, or the reinforcing fiber base material heated in advance may be subjected to the powder coating to be fused simultaneously with the application of the matrix resin fine powder to the fiber base material. Through the heating and melting, the matrix resin on the surface of the reinforcing fiber base material is melted to enhance adhesiveness to the base material, and hence elimination of the coating resin powder is prevented. However, in the FRP molding material to be obtained, the matrix resin is concentrated on the surface of the reinforcing fiber base material, and does not permeate the inside of the reinforcing fiber base material as in a molded body after heating compression molding. A heating time for fusing the matrix resin after the powder coating is not particularly limited, but is generally suitably from 1 min to 2 min. A melting temperature is from 150° C. to 240° C., preferably from 160° C. to 220° C., more preferably from 180° C. to 200° C. When the melting temperature is higher than the upper limit, there is a risk in that a curing reaction may proceed. In addition, when the melting temperature is lower than the lower limit, the thermal fusion is insufficient, and hence there is a concern that dust fall, elimination, or the like of the matrix resin fine powder may occur at the time of handling and working with the FRP molding material.

This step is heat treatment performed in order to fix the matrix resin, which has been subjected to the powder coating, to the fiber base material. When the heat treatment is not performed, the matrix resin undergoes dust fall during molding. Accordingly, when the heat treatment is performed in a period of time much shorter than that in the press molding, the phenoxy resin and the epoxy resin are fixed to the fiber base material by thermal fusion without allowing the cross-linking agent and the resins to react.

For the reinforcing fiber base material, carbon fiber having high strength and good thermal conductivity is preferably used. In particular, pitch-based carbon fiber has high thermal conductivity as well as high strength. Therefore, the pitch-based carbon fiber can rapidly diffuse generated heat, and hence is more preferred. The form of the reinforcing fiber base material is not particularly limited, and there may be used, for example, a unidirectional material, a cloth of plain weave, twill weave, or the like, a three-dimensional cloth, a chopped strand mat, a tow formed of thousands or more of filaments, or a nonwoven fabric. Those reinforcing fiber base materials may be used alone or in combination thereof.

In addition, in the powder coating, a reinforcing fiber base material subjected to fiber opening treatment is preferably used. The fiber opening treatment further facilitates the impregnation of the inside of the reinforcing fiber base material with the matrix resin at the time of the powder coating and the subsequent molding processing, and hence higher physical properties of the molded article can be expected.

The FRP molded article can be easily produced by heating and compressing the FRP molding material of the present invention alone or in a laminated state. In addition, in the lamination, for example, metal foil of aluminum, stainless steel, or the like may be laminated between layers or on the outermost layer. The FRP molding material of the present invention can be simultaneously subjected to shaping, and cross-linking and curing of the matrix resin by compression molding by heat pressing.

The molding using the FRP molding material may be performed by appropriately selecting any of various molding methods, such as autoclave molding and heat press molding using a mold, in accordance with the size and shape of the FRP molded article of interest as long as the molding is heating compression molding. When the phenoxy resin fine powder is used alone as the matrix resin, the molding temperature is, for example, from 160° C. to 250° C., preferably from 180° C. to 240° C., more preferably from 180° C. to 230° C. When fine powder of each of the epoxy resin and the cross-linking agent is used in combination with the phenoxy resin fine powder as the matrix resin, the molding temperature is, for example, from 150° C. to 240° C., preferably from 160° C. to 220° C., more preferably from 180° C. to 200° C. When the molding temperature is higher than the upper limit temperature, excessive heat that is more than necessary is applied, and hence the molding time (takt time) lengthens to degrade productivity. When the molding temperature is lower than the lower limit temperature, owing to the high melt viscosity of the matrix resin, the impregnating property of the matrix resin into the reinforcing fiber base material degrades. With regard to the molding time, the molding may be performed in generally from 30 min to 60 min. When the fine powder of each of the epoxy resin and the cross-linking agent is used in combination with the phenoxy resin fine powder as the matrix resin, even in a short period of time of about 10 min, strength allowing demolding can be obtained by virtue of the reaction with the cross-linking agent (C) utilizing the secondary hydroxy group of the phenoxy resin (A) serving as a main component. However, in order to complete the curing reaction of the epoxy resin (B), post-curing is preferably performed, for example, at from 200° C. to 250° C. for from about 30 min to about 60 min.

The demolding temperature of the produced FRP molded article is set in consideration of, for example, the kind of the matrix resin and productivity. The demolding temperature is, for example, from 100° C. to 120° C. The case where the cross-linking agent is used for the purpose of improving the Tg of the phenoxy resin serving as an essential component of the matrix resin is preferred because the cross-linking can be allowed to proceed reliably by separately performing post-curing in any of various ovens at from 100° C. to 200° C. after demolding.

When the cross-linking agent or the epoxy resin and the cross-linking agent are blended, heat resistance greatly increases as compared to that before the molding through the cross-linking reaction utilizing the secondary hydroxy group of the phenoxy resin, and a molded article having a Tg of 160° C. or more is obtained. The softening point of the cured product of the matrix resin is present within generally −25° C. with respect to the Tg. Therefore, for example, in heat press molding using a mold, the temperature at which the molded article is demolded from the mold may be in the range of −30° C. or lower with respect to the Tg of the cured product of the matrix resin, preferably −35° C. or lower with respect to the Tg of the cured product, more preferably −40° C. or lower with respect to the Tg. When the demolding temperature is higher than the upper limit temperature of the above-mentioned range, shaping cannot be kept. In addition, when the demolding temperature is excessively low, a period of time required for cooling lengthens and hence the takt time lengthens, with the result that productivity lowers.

The softening point refers to the temperature of an inflection point at which a storage modulus of elasticity (E'), which is measured by DMA of the cured product of the matrix resin, attenuates.

EXAMPLES

The present invention is more specifically described below by way of Examples and Comparative Examples. However, the present invention is not limited to the description of these Examples.

Test and measurement methods for various physical properties are as described below.

Particle Size (d50)

As the average particle diameter of, for example, fine powder of a matrix resin or the like, a particle diameter on a volume basis at a cumulative volume of 50% was measured with a laser diffraction/scattering particle diameter distribution analyzer (Microtrac MT3300EX, manufactured by Nikkiso Co., Ltd.).

Glass Transition Temperature (Tg) of Molded Article

Ten sheets of an FRP molding material were stacked and subjected to heat pressing to produce a laminated plate. A test piece having a thickness of 2 mm, a width of 10 mm, and a length of 10 mm was produced from the laminated plate with a diamond cutter, and subjected to measurement with a dynamic viscoelasticity measuring apparatus (DMA 7e manufactured by Perkin Elmer) under the temperature increase condition of 5° C./min in the range of from 25° C. to 250° C. The maximum peak of tan δ thus obtained was defined as a glass transition point.

Melt Viscosity

With the use of a rheometer (manufactured by Anton Paar), a sample having a size of 4.3 cm$^3$ was sandwiched between parallel plates, and while temperature was increased at 20° C./min, a melt viscosity at 180° C. was measured under the conditions of a frequency of 1 Hz and a loaded strain of 5%.

Tackiness

A case where no tackiness was felt with a finger on the surface of an FRP molding material was judged as acceptable and marked with symbol "○" in a table.

Resin Content (RC: %)

A resin content was calculated from the weight (W1) of a reinforcing fiber cloth before the adhesion of a matrix resin and the weight (W2) of an FRP molding material after the adhesion of the resin through the use of the following equation.

Resin content (RC: %)=(W2−W1)/W2×100

W1: weight of reinforcing fiber cloth before adhesion of resin
W2: weight of FRP molding material after adhesion of resin Mechanical Strength The mechanical physical properties of an obtained FRP laminated plate were measured on the basis of a bending test method for a carbon fiber-reinforced plastic of JIS K 7074: 1988.

Storage Stability

Ten sheets of an FRP molding material, which had been stored in a chamber with no particular temperature and humidity control for 3 months, were stacked on a Teflon (trademark) sheet, and the whole was pressed at 5 MPa for 5 min with a press machine heated to 200° C. to produce a laminated plate. The laminated plate was subjected to the evaluations of thermal physical properties and mechanical physical properties. Comparison was made with a laminated plate produced before the 3 months, and a case where the error of the physical properties was within the range of ±10% was judged as acceptable and marked with symbol "○" in a table.

Resin Impregnating Property

Ten sheets of an FRP molding material were stacked on a Teflon sheet, and the whole was pressed at 5 MPa for 5 min with a press machine heated to 200° C. to produce a laminated plate. After that, several small pieces of 10 mm square were cut out of the laminated plate with a diamond cutter. The cut surface of each of the cut-out small pieces was polished with water-resistant abrasive paper of #1000 or more, and then observed with an optical microscope to confirm the presence or absence of a void.

A satisfactory case was marked with symbol "○", a case where one or two voids were present was marked with symbol "Δ", and a case where many voids were present was marked with symbol "x".

Flame Retardancy Test

In conformity to a vertical burning test specified in the US UL standard UL94, a test piece measuring 125 mm long by 13 mm wide by 1 mm thick was evaluated. A case of having flame retardancy corresponding to V-0 was marked with symbol "◉", a case of having flame retardancy corresponding to V-1 or V-2 was marked with symbol "○", and a case of having no flame retardancy was marked with symbol "x" in a table.

Materials used in Examples and Comparative Examples are as described below.

Phenoxy Resin (A)
(A-1) Phenotohto YP-50S (manufactured by Nippon Steel & Sumikin Chemical Co., Ltd., bisphenol A-type, Mw=60,000, hydroxy group equivalent=284), Tg=84° C., melt viscosity at 200° C.=400 Pa·s
(A-2) Phenotohto YP-70 (manufactured by Nippon Steel & Sumikin Chemical Co., Ltd., bisphenol A/bisphenol F copolymer-type phenoxy resin, Mw=55,000, hydroxy group equivalent=270), Tg=70° C., melt viscosity at 200° C.=140 Pa·s
(A-3) Phenotohto YPB-43C (manufactured by Nippon Steel & Sumikin Chemical Co., Ltd. brominated phenoxy resin, Mw=60,000, hydroxy group equivalent=600), Tg=149° C., melt viscosity at 220° C.=2,000 Pa·s Epoxy Resin (B)
(B-1): YSLV-80XY (manufactured by Nippon Steel & Sumikin Chemical Co., Ltd. tetramethylbisphenol F-type, epoxy equivalent=192, melting point=72C)
Crosslinking Agent (C)
(C-1): pyromellitic anhydride (acid anhydride equivalent=109, melting point=283-286° C.)

Example 1

The phenoxy resin (A-1) was pulverized and classified to provide powder having an average particle diameter d50 of 100 µm. The powder was subjected to powder coating on a reinforcing fiber base material of plain weave subjected to fiber opening treatment, which was formed of carbon fiber (manufactured by Toho Tenax, STANDARD Modulus type HTS403K), in an electrostatic field under the conditions of a charge of 70 kV and a spraying air pressure of 0.32 MPa. After that, the resultant was heated and melted in an oven at 200° C. for 2 min to thermally fuse the resin. Thus, an FRP molding material was obtained. The obtained FRP molding material was measured for various physical properties.

After that, ten sheets of the obtained FRP molding material were stacked on a Teflon sheet, and the whole was pressed at 5 MPa for 5 min with a press machine heated to 200° C. to produce a laminated plate. Then, the evaluations of mechanical physical properties were performed. The results of the evaluations are shown in Table 1.

Examples 2 and 3

The phenoxy resin (A-1) or (A-2) was pulverized and classified to produce powder having a d50 of from 50 µm to 80 µm, an FRP molding material was obtained in the same manner as in the foregoing, and a laminated plate was produced in the same manner as in the foregoing. Then, the evaluations of mechanical physical properties were performed. The results of the evaluations are shown in Table 1.

Comparative Example 1

The phenoxy resin (A-1) was dissolved in methyl ethyl ketone, the solution was applied to a PET film with a release agent, and then the solvent was volatilized in an oven to peel off and form a film. Then, the phenoxy resin (A-1) film was alternately laminated with a reinforcing fiber base material of plain weave subjected to fiber opening treatment, which was formed of carbon fiber (manufactured by Toho Tenax, STANDARD Modulus type HTS40 3K), to stack ten sheets, and the whole was pressed at 5 MPa for 5 min with a press machine heated to 200° C. to produce a laminated plate. Then, the evaluations of mechanical physical properties were performed. The results of the evaluations are shown in Table 1. The thickness of the phenoxy resin film was adjusted so as to achieve the same RC as that of Example 1.

Comparative Example 2

An FRP molding material was obtained in the same manner as in Examples 1 to 3 except that 6-nylon resin powder (NYLOTEX200, Tg=200° C., melt viscosity at 220° C.=220 Pa·s) was used as matrix resin powder and the press temperature was set to 230° C., and a laminated plate was produced. Then, various evaluations were performed. The results are shown in Table 1.

TABLE 1

|  |  | Example 1 | Example 2 | Example 3 | Comparative Example 1 | Comparative Example 2 |
|---|---|---|---|---|---|---|
| Matrix resin | A-1 | 100 | 100 | — | 100 | — |
|  | A-2 | — | — | 100 | — | — |
|  | 6-Nylon | — | — | — | — | 100 |
| FRP molding material | d50 | 100 | 50 | 80 | 100 | 50 |
|  | Tackiness | ○ | ○ | ○ | ○ | ○ |
|  | RC (%) | 30 | 30 | 35 | 30 | 34 |
|  | *Draping property | ○ | ○ | ○ | x | ○ |
| FRP molded article | Bending modulus of elasticity (GPa) | 50 | 66 | 49 | 2 | 24 |
|  | Bending strength (MPa) | 670 | 749 | 652 | 354 | 67 |
|  | Resin impregnating property | ○ | ○ | ○ | x | x |
|  | Storage stability | ○ | ○ | ○ | ○ | ○ |

*The draping property refers to the shape followability of the FRP molding material, and was evaluated on the basis of the bending property of the FRP molding material adjusted under an environment at 23° C. and 50% RH for 24 hr.
Judgment criteria therefore are shown below.
○ The FRP molding material is flexible and easily bendable, and hence does not cause the peeling off of the adhering matrix resin or the breakage of the reinforcing fiber even when shaped into a mold having a complicated shape with a large curvature.
x The FRP molding material is not easily bendable, and hence causes the peeling off of the matrix resin or the breakage of the reinforcing fiber when shaped into a mold having a complicated shape with a large curvature.

Examples 4 and 5

The phenoxy resins (A-1) and (A-3) were each pulverized and classified to produce powder having an average particle diameter d50 of from 80 μm to 100 μm. The powders were dry-blended at a ratio (parts by mass) shown in Table 2. After that, an FRP molding material was obtained in the same manner as in Examples 1 to 3, and a laminated plate was produced at a press temperature of 220° C. Then, various evaluations including the flame retardancy test were performed. The results are shown in Table 2.

TABLE 2

|  |  | Example 4 | Example 5 |
|---|---|---|---|
| Matrix resin | A-1 | 67 | — |
|  | A-3 | 33 | 100 |
|  | d50 | 80 | 100 |
| FRP molding material | Tackiness | ○ | ○ |
|  | RC (%) | 32 | 37 |
|  | Draping property | ○ | ○ |
| FRP molded article | Bending modulus of elasticity (GPa) | 46 | 68 |
|  | Bending strength (MPa) | 637 | 1,025 |
|  | Resin impregnating property | ○ | ○ |
|  | Storage stability | ○ | ○ |
|  | Flame retardancy | ◎ | ◎ |

It is found from the results obtained in Tables 1 and 2 that the FRP molding material of the present invention produced by causing the matrix resin containing the phenoxy resin as an essential component to adhere to the carbon fiber serving as the reinforcing fiber base material by the powder coating method has a satisfactory handling property and can be molded into even a complicated shape. In addition, the FRP molded using such FRP molding material had mechanical physical properties sufficient for use as a housing of a portable electronic device.

Example 6

The (A-1) serving as the phenoxy resin (A), the (B-1) serving as the epoxy resin (B), and the (C-1) serving as the cross-linking agent (C) were each pulverized and classified to provide powder having an average particle diameter D50 of 100 μm. The powders were dry-blended at a ratio (parts by weight) shown in Table 3, and the resultant was subjected to powder coating on a reinforcing fiber base material of plain weave subjected to fiber opening treatment, which was formed of carbon fiber (manufactured by Toho Tenax, STANDARD Modulus type HTS40 3K), in an electrostatic field under the conditions of a charge of 70 kV and a spraying air pressure of 0.32 MPa. After that, the resultant was heated and melted in an oven at 180° C. for 2 min to thermally fuse the resins. Thus, an FRP molding material was obtained. The obtained FRP molding material had a resin content (RC) of 27%.

The FRP molding material obtained in the foregoing was subjected to the evaluation of tackiness. After that, ten sheets thereof were stacked on a Teflon sheet, and the whole was pressed at 5 MPa for 10 min with a press machine heated to 200° C. to provide an FRP laminated plate. After that, after-curing was performed in an oven for 2 hr, and the evaluations of mechanical physical properties were performed.

The results of the evaluations are shown in Table 3.

Examples 7 to 13

FRP molding materials and FRP laminated plates were each produced in the same manner as in Example 6 except that phenoxy resin (A-1) or (A-2) powder pulverized and classified so as to have an average particle diameter D50 of 80 μm was used as the phenoxy resin (A). Then, evaluations were performed. The results of the evaluations are shown in Table 3.

TABLE 3

| Example |  | 6 | 7 | 8 | 9 | 10 | 11 | 12 | 13 |
|---|---|---|---|---|---|---|---|---|---|
| Phenoxy resin | A-1 | 100 | 100 | — | 100 | 100 | 100 | 100 | 100 |
|  | A-2 | — | — | 100 | — | — | — | — | — |
|  | d50 | 100 | 80 | 80 | 80 | 80 | 80 | 80 | 80 |
| Epoxy resin | B-1 | 45 | 45 | 45 | 9 | 10 | 45 | 80 | 78 |
| Cross-linking agent | C-1 | 46 | 46 | 46 | 26 | 50 | 26 | 38 | 42 |
|  | Molar ratio | 1.2 | 1.2 | 12 | 0.7 | 1.3 | 0.7 | 1.0 | 1.1 |
|  | Melt viscosity at from 160° C. to 220° C. (Pa · s) | 2,000 | 2,000 | 15 | 2,800 | 2,500 | 2,000 | 320 | 300 |
| FRP molding material | Tackiness | ○ | ○ | ○ | ○ | ○ | ○ | ○ | ○ |
|  | RC (%) | 27 | 35 | 38 | 34 | 40 | 40 | 36 | 38 |
|  | Storage stability | ○ | ○ | ○ | ○ | ○ | ○ | ○ | ○ |
| FRP molded article | Glass transition temperature (° C.) | 178 | 218 | 188 | 171 | 203 | 196 | 185 | 201 |
|  | Resin softening temperature (° C.) | 163 | 207 | 169 | 156 | 188 | 171 | 165 | 180 |

TABLE 3-continued

| Example | 6 | 7 | 8 | 9 | 10 | 11 | 12 | 13 |
|---|---|---|---|---|---|---|---|---|
| Bending modulus of elasticity (GPa) | 60 | 42 | 44 | 52 | 53 | 47 | 57 | 43 |
| Bending strength (MPa) | 300 | 642 | 716 | 401 | 639 | 537 | 834 | 709 |
| Resin impregnating property | ○ | ○ | ○ | ○ | ○ | ○ | ○ | ○ |

Comparative Example 3

An FRP laminated plate was produced in exactly the same manner except that an FRP molding material was produced by performing the application of the matrix resin to the reinforcing fiber base material by using, instead of the powder coating method (electrostatic coating method), a solvent method using a solution (solid content concentration: 10 wt %) obtained by dissolving matrix resin powder of the same blend as that of Example 6 in methyl ethyl ketone (MEK), followed by drying in a drying furnace at 160° C. for 1 min. Then, various evaluations were performed. The results are shown in Table 4.

Examples 14 to 16

Phenoxy resin (A-1) powder serving as the phenoxy resin (A), which had been pulverized and classified so as to have an average particle diameter d50 of 80 μm, and powders respectively obtained by pulverizing and classifying the (B-1) serving as the epoxy resin (B) and the (C-1) serving as the cross-linking agent (C) were dry-blended according to a blend (parts by weight) shown in Table 4, and FRP molding materials and FRP laminated plates were produced in the same manner as in Example 6. Then, evaluations were performed. The results of the evaluations are also shown in Table 4.

TABLE 4

|  |  | Comparative Example 3 | Example 14 | Example 15 | Example 16 |
|---|---|---|---|---|---|
| Phenoxy resin | A-1 | 100 | 100 | 100 | 100 |
|  | A-2 | — | — | — | — |
|  | A-3 | — | — | — | — |
|  | d50 | 80 | 80 | 80 | 80 |
| Epoxy resin | B-1 | 45 | 10 | 45 | 100 |
| Cross-linking agent | C-1 | 46 | 58 | 12 | 42 |
|  | Molar ratio | 1.2 | 1.5 | 0.3 | 1.2 |
| Application to reinforcing fiber base material |  | Impregnation | Electrostatic | Electrostatic | Electrostatic |
| Melt viscosity at from 160° C. to 220° C. (Pa · s) |  | 2,000 | 3,200 | 940 | 85 |
| FRP molding material | Tackiness | x | ○ | ○ | ○ |
|  | RC (%) | 30 | 32 | 34 | 39 |
|  | Storage stability | x | ○ | ○ | ○ |
| FRP molded article | Glass transition temperature (° C.) | 125 | 124 | 89 | 158 |

TABLE 4-continued

|  |  | Comparative Example 3 | Example 14 | Example 15 | Example 16 |
|---|---|---|---|---|---|
|  | Resin softening temperature (° C.) | 105 | 105 | 81 | 148 |
|  | Bending modulus of elasticity (GPa) | 43 | 38 | 51 | 40 |
|  | Bending strength (MPa) | 825 | 215 | 686 | 526 |
|  | Resin impregnating property | ○ | Δ | ○ | ○ |

Examples 17 and 18

Phenoxy resin (A-1) and (A-3) powder to be used as the phenoxy resin (A), which had been pulverized and classified so as to have an average particle diameter D50 of 80 μm, and powders respectively obtained by pulverizing and classifying the (B-1) serving as the epoxy resin (B) and the (C-1) serving as the cross-linking agent (C) were dry-blended according to a blend (parts by weight) and a molar ratio shown in Table 5, and FRP molding materials and FRP laminated plates were produced in the same manner as in Example 6. Then, various evaluations including the flame retardancy test were performed. The results of the evaluations are shown in Table 5.

TABLE 5

|  |  | Example 17 | Example 18 |
|---|---|---|---|
| Phenoxy resin | A-1 | 50 | — |
|  | A-2 | — | — |
|  | A-3 | 50 | 100 |
|  | d50 | 80 | 80 |
| Epoxy resin | B-1 | 45 | 45 |
| Cross-linking aaent | C-1 | 46 | 46 |
|  | Molar ratio | 1.2 | 1.2 |
| Melt viscosity at from 160° C. to 220° C. (Pa · s) |  | 820 | 2,200 |
| FRP molding material | Tackiness | ○ | ○ |
|  | RC (%) | 33 | 37 |
|  | Storage stability | ○ | ○ |
| FRP molded article | Glass transition temperature (° C.) | 189 | 222 |
|  | Resin softening temperature (° C.) | 172 | 197 |
|  | Bending modulus of elasticity (GPa) | 53 | 48 |
|  | Bending strength (MPa) | 691 | 848 |
|  | Resin impregnating property | ○ | ○ |
|  | Flame retardancy | ◎ | ◎ |

It is found from the results obtained in Tables 3 to 5 that the FRP molding material obtained by causing fine powder of the matrix resin containing the phenoxy resin (A), the epoxy resin (B), and the cross-linking agent (C) as essential components to adhere to the reinforcing fiber base material by the powder coating is free of tackiness, and hence has a satisfactory handling property, and also has satisfactory storage stability, and besides, its molded article has an excellent heat resistance of 160° C. or more. Further, the FRP molding material of each of Examples of the present invention has a draping property, and hence can be processed into a molded article having a complicated shape, and depending on the blending formulation of the matrix resin, can provide an FRP molded article having flame retardancy in addition to high heat resistance and mechanical physical properties. Accordingly, the FRP molding material is extremely excellent as an FRP molding material applicable to electronic housings and also to automobile materials.

INDUSTRIAL APPLICABILITY

The fiber-reinforced plastic molding material of the present invention can be utilized as a fiber-reinforced plastic (FRP) material in a wide range of fields, for example, bodies in transportation equipment, such as automobiles and aviation equipment, housings of electronic devices, such as notebook PCs and tablets, arms of industrial robots and the like, reinforcing materials for architectural structures, and the fields of sports and leisure.

The invention claimed is:

1. A fiber-reinforced plastic molding material, comprising:
   a fine powder of a matrix resin adhered to a reinforcing fiber base material by a powder coating method, wherein the matrix resin is present in an amount of from 20 wt % to 50 wt % of the fiber-reinforced plastic molding material;
   the fine powder has an average particle diameter (d50) of from 10 µm to 150 µm;
   the matrix resin comprises a resin component being solid at ordinary temperature and an optional cross-linking agent (C) being solid at ordinary temperature, wherein the resin component contains 50 wt % or more of a phenoxy resin (A) and an optional epoxy resin (B);
   the crosslinking-agent (C) is present in the matrix resin when the epoxy resin (B) is present in the resin component, and the crosslinking-agent (C) is optionally present in the matrix resin when the epoxy resin (B) is not present in the resin component;
   the matrix resin has a melt viscosity of 3,000 Pa·s or less at any of a temperature region of from 160° C. to 220° C. when the epoxy resin (B) is present in the resin composition; and the phenoxy resin (A) has a melt viscosity of 3,000 Pa·s or less at anywhere in a temperature region of from 160° C. to 220° C. when the epoxy resin (B) is not present in the resin composition.

2. A fiber-reinforced plastic molding material according to claim 1, wherein the reinforcing fiber base material has a form of a unidirectional material, a cloth of plain weave, a twill weave, a three-dimensional cloth, a chopped strand mat, or a tow formed of thousands of filaments.

3. A fiber-reinforced plastic molding material according to claim 1, wherein the reinforcing fiber base material comprises at least one kind of fiber selected from the group consisting of carbon fiber, boron fiber, silicon carbide fiber, glass fiber, and aramid fiber.

4. A fiber-reinforced plastic molding material according to claim 1, wherein the phenoxy resin (A) has a mass-average molecular weight of from 20,000 to 100,000.

5. A fiber-reinforced plastic molding material according to claim 1, wherein the phenoxy resin (A) has a hydroxy group equivalent of from 50 g/eq to 750 g/eq.

6. A fiber-reinforced plastic molding material according to claim 1, wherein the phenoxy resin (A) has a glass transition temperature of from 65° C. to 160° C.

7. A fiber-reinforced plastic molding material according to claim 1, wherein the resin component contains from 9 parts by weight to 85 parts by weight of the epoxy resin (B) with respect to 100 parts by weight of the phenoxy resin (A).

8. A fiber-reinforced plastic molding material according to claim 7, wherein the cross-linking agent (C) comprises an acid anhydride, and is blended so that an amount of an acid anhydride group falls within a range of from 0.5 mol to 1.3 mol with respect to 1 mol of a secondary hydroxy group of the phenoxy resin (A).

9. A fiber-reinforced plastic molding material according to claim 7, wherein the phenoxy resin (A) and the epoxy resin (B) each have an average particle diameter (d50) of from 10 µm to 150 µm, and from 1 to 2 times as large as an average particle diameter (d50) of the cross-linking agent (C).

10. A fiber-reinforced plastic molded article, which is obtained by molding or curing the fiber-reinforced plastic molding material of any one of claims 1 to 6 and 7 to 9 by heating and compression.

11. A fiber-reinforced plastic molded article according to claim 10, wherein the resin component contains the epoxy resin (B), and the matrix resin has been cured to have a glass transition temperature of 160° C. or more.

12. A method of producing a fiber-reinforced plastic molding material, comprising:
    preparing a matrix resin;
    pulverizing the matrix resin to a fine powder having an average particle diameter (d50) of from 10 µm to 150 µm; and
    adhering the fine powder of matrix resin to a reinforcing fiber base material by a powder coating method, wherein the matrix resin is present in an amount of from 20 wt % to 50 wt % of the fiber-reinforced plastic molding material;
    the matrix resin comprises a resin component being solid at ordinary temperature and an optional cross-linking agent (C) being solid at ordinary temperature, wherein the resin component contains 50 wt % or more of a phenoxy resin (A) and an optional epoxy resin (B);
    the crosslinking-agent (C) is present in the matrix resin when the epoxy resin (B) is present in the resin component, and the crosslinking-agent (C) is optionally present in the matrix resin when the epoxy resin (B) is not present in the resin component;
    the matrix resin has a melt viscosity of 3,000 Pa·s or less at any of a temperature region of from 160° C. to 220° C. when the epoxy resin (B) is present in the resin composition; and the phenoxy resin (A) has a melt viscosity of 3,000 Pa·s or less at anywhere in a temperature region of from 160° C. to 220° C. when the epoxy resin (B) is not present in the resin composition.

13. A method of producing a fiber-reinforced plastic molding material according to claim 12, wherein the resin component contains from
    9 parts by weigh to 85 parts by weight of the epoxy resin (B) with respect to 100 parts by weight of the phenoxy resin (A).

14. A method of producing a fiber-reinforced plastic molding material according to claim 13, wherein the powder coating method comprises a powder coating method utilizing an electrostatic field.

* * * * *